(12) United States Patent
Silverman et al.

(10) Patent No.: US 6,814,377 B2
(45) Date of Patent: Nov. 9, 2004

(54) COMPUTER QUICK RELEASE LATCH

(75) Inventors: Ira Silverman, San Jose, CA (US);
Vadim Pichahchi, Mountain View, CA (US); Stanislav Moiseyenko, Mountain View, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/274,821

(22) Filed: Oct. 19, 2002

(65) Prior Publication Data

US 2004/0075282 A1 Apr. 22, 2004

(51) Int. Cl.$^7$ .................................................. E05C 19/06
(52) U.S. Cl. ..................................... 292/83; 312/223.2
(58) Field of Search ........................ 24/536, 538, 607, 24/635; 206/320; 248/316.3, 316.4; 292/10, 13, 19, 83, 91; 312/208.1, 208.4, 223.2

(56) References Cited

U.S. PATENT DOCUMENTS

| | | | | | |
|---|---|---|---|---|---|
| 154,408 | A | * | 8/1874 | Mcknight | |
| 1,314,628 | A | * | 9/1919 | Willman | 312/29 |
| 2,545,742 | A | * | 3/1951 | Mogensen | 312/208.4 |
| 3,166,365 | A | * | 1/1965 | Zeamer et al. | 312/208.4 |
| 3,522,963 | A | * | 8/1970 | Farnden | 292/83 |
| 4,500,120 | A | * | 2/1985 | Ridgewell | 292/19 |
| 5,033,709 | A | * | 7/1991 | Yuen | 248/313 |
| 5,056,846 | A | * | 10/1991 | Tanaka | 296/37.1 |
| 5,220,712 | A | * | 6/1993 | Taki | 24/614 |
| 5,836,563 | A | * | 11/1998 | Hsin-Yung | 248/316.4 |
| 5,890,693 | A | * | 4/1999 | Do et al. | 248/346.03 |
| 6,182,298 | B1 | * | 2/2001 | Dampney | 2/422 |
| 6,286,667 | B1 | * | 9/2001 | Lee | 206/38 |
| 6,382,580 | B1 | * | 5/2002 | Wisniewski | 248/316.4 |
| 6,585,212 | B2 | * | 7/2003 | Carnevali | 248/346.07 |
| 6,606,241 | B2 | * | 8/2003 | Moore | 361/685 |

* cited by examiner

*Primary Examiner*—Gary Estremsky
(74) *Attorney, Agent, or Firm*—Sheppard Mullin Richter & Hampton LLP

(57) ABSTRACT

Computer quick release latch. The quick release latch operates to quickly attach and release a portable device from a secure attachment. The latch comprises a spring-loaded attachment mechanism that can be detachably attached to a bottom surface of the portable device. The latch also comprises a release handle that is captured by the attachment mechanism. The release handle has profiled edges and movement of the release handle in any direction within a release plane causes the profiled edges to release the attachment mechanism from the portable device.

14 Claims, 7 Drawing Sheets

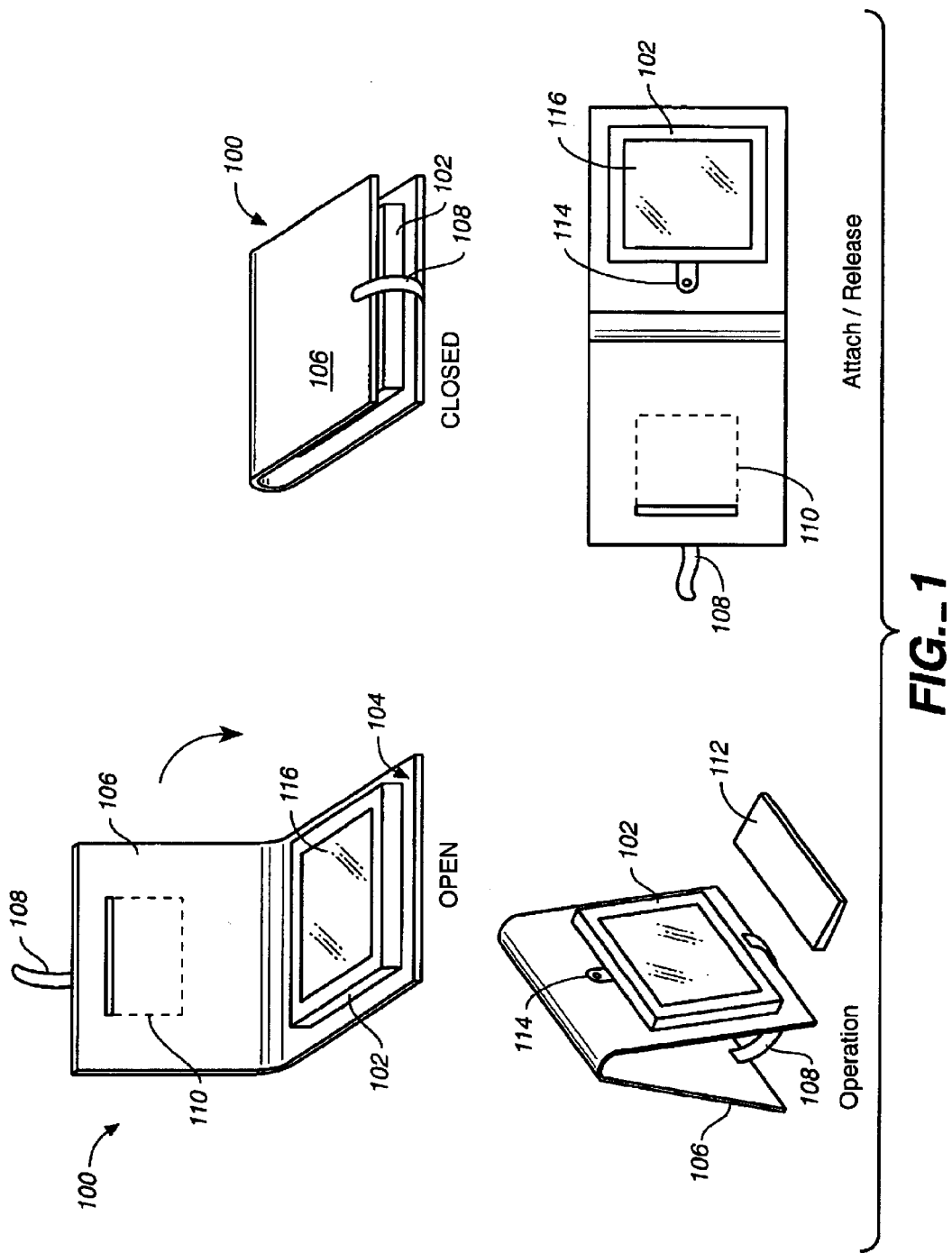
FIG._1

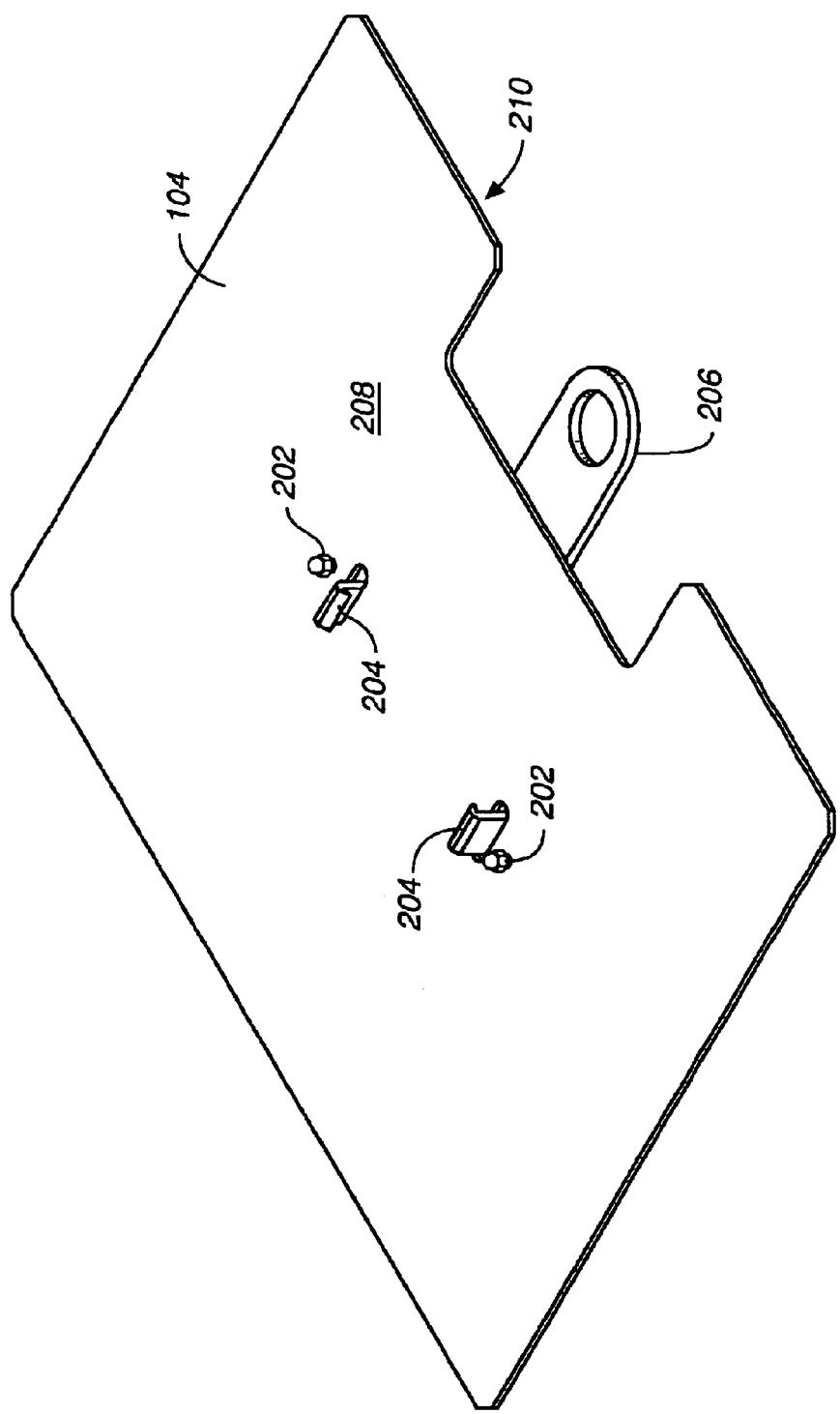
FIG._2

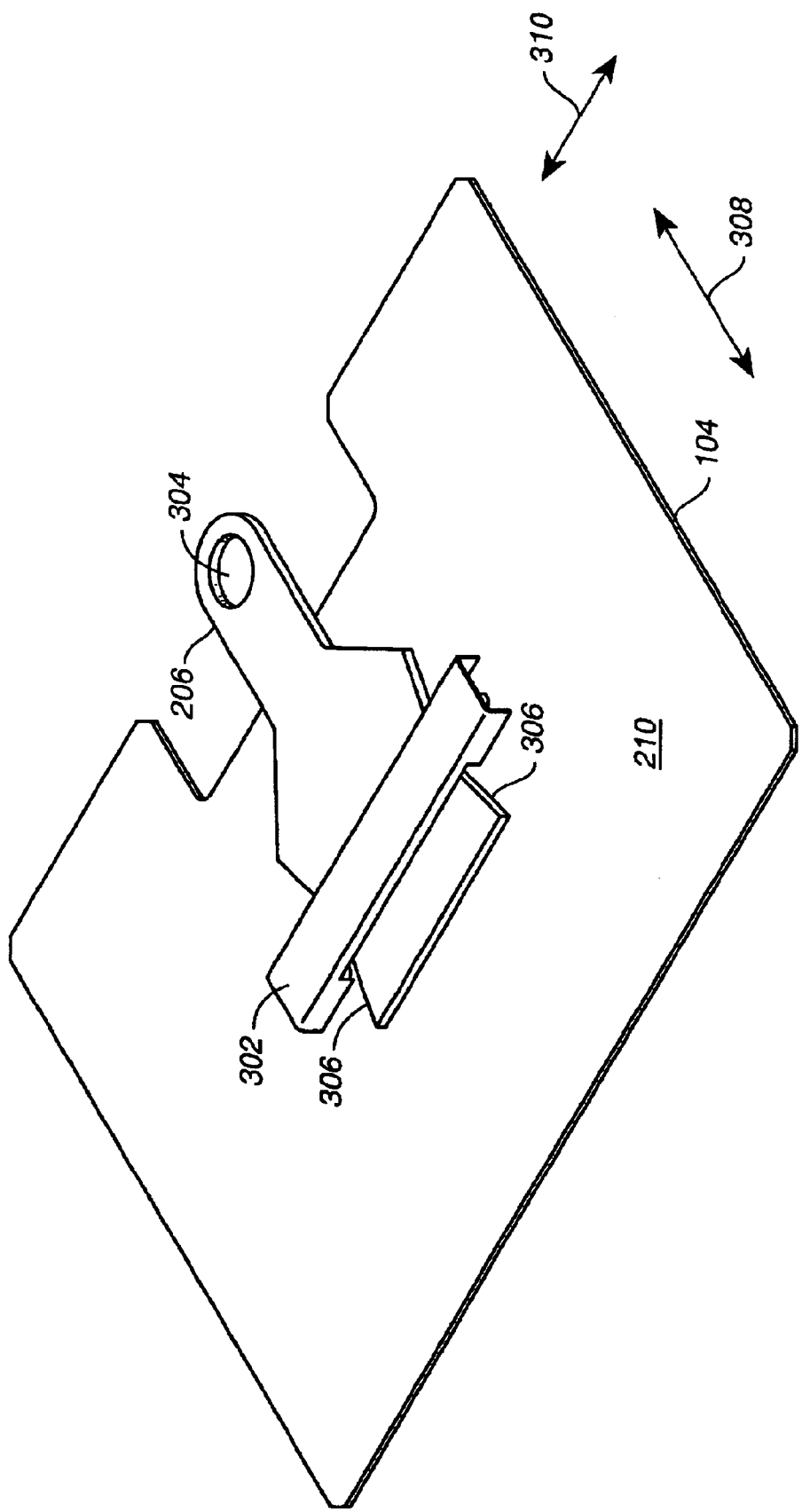
FIG._3

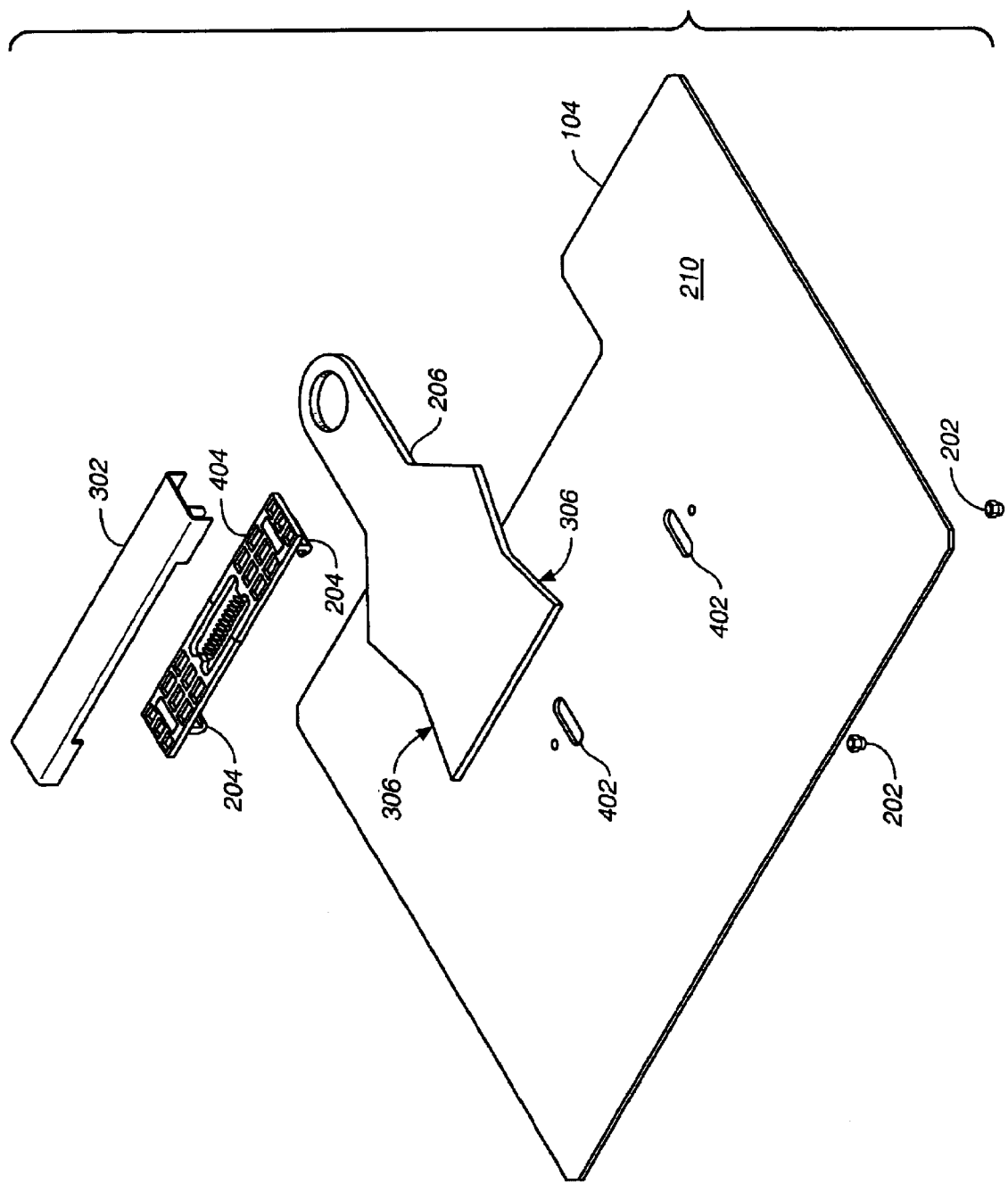

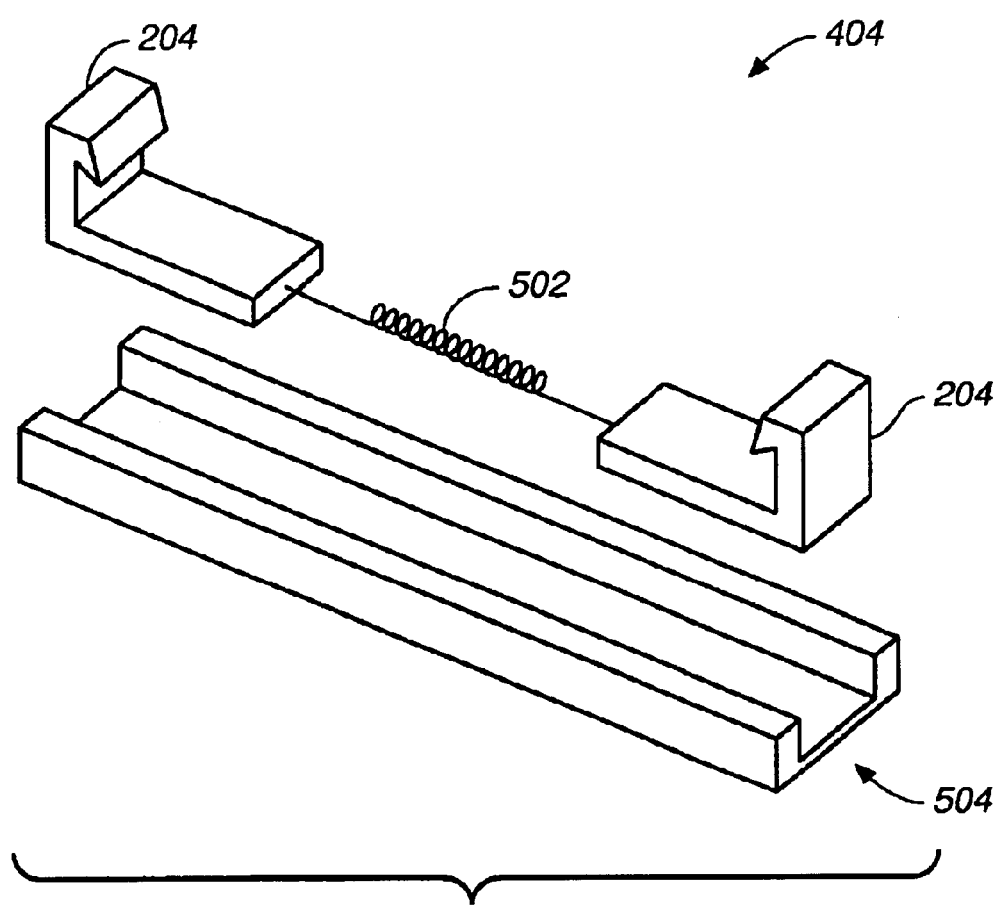
FIG._5

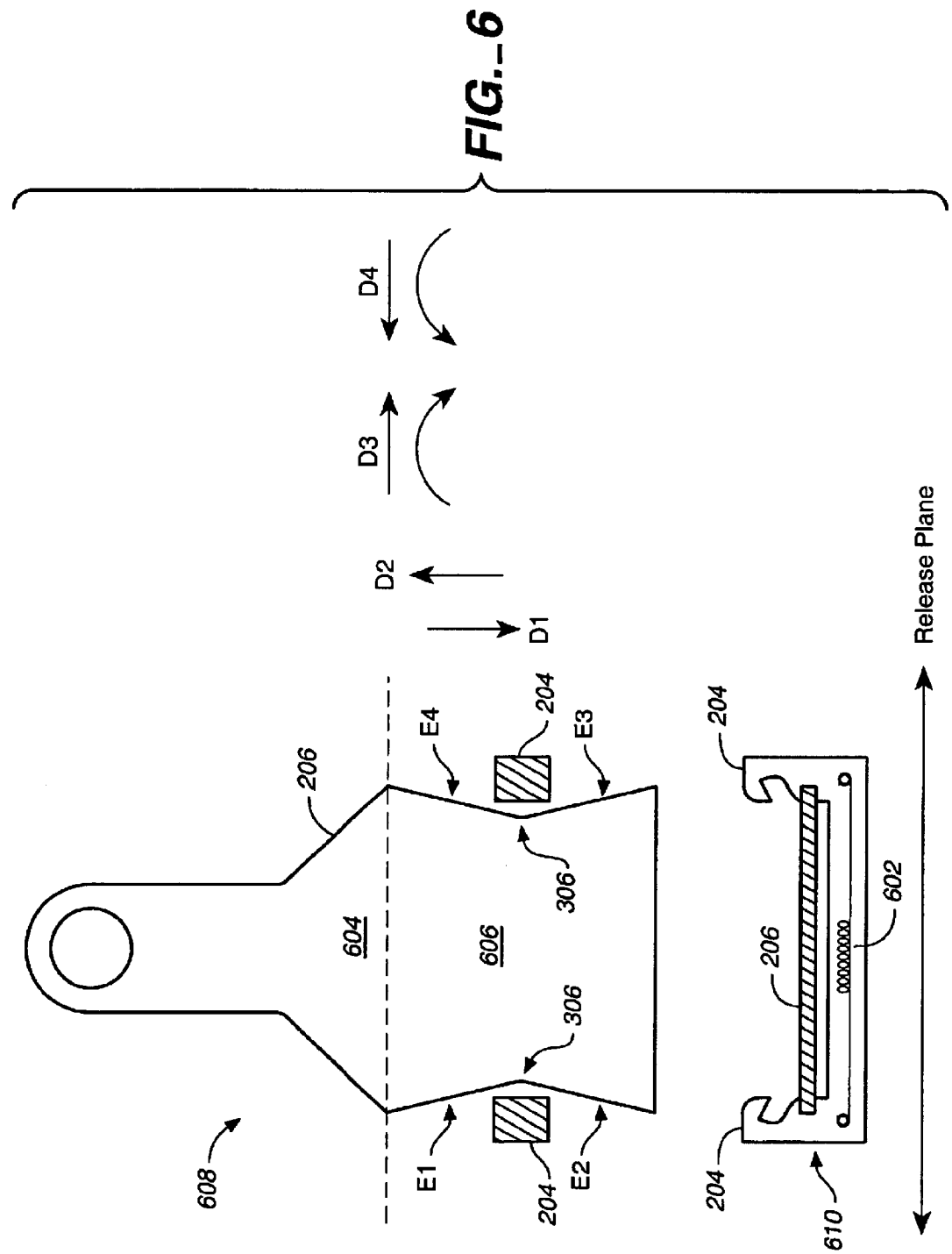

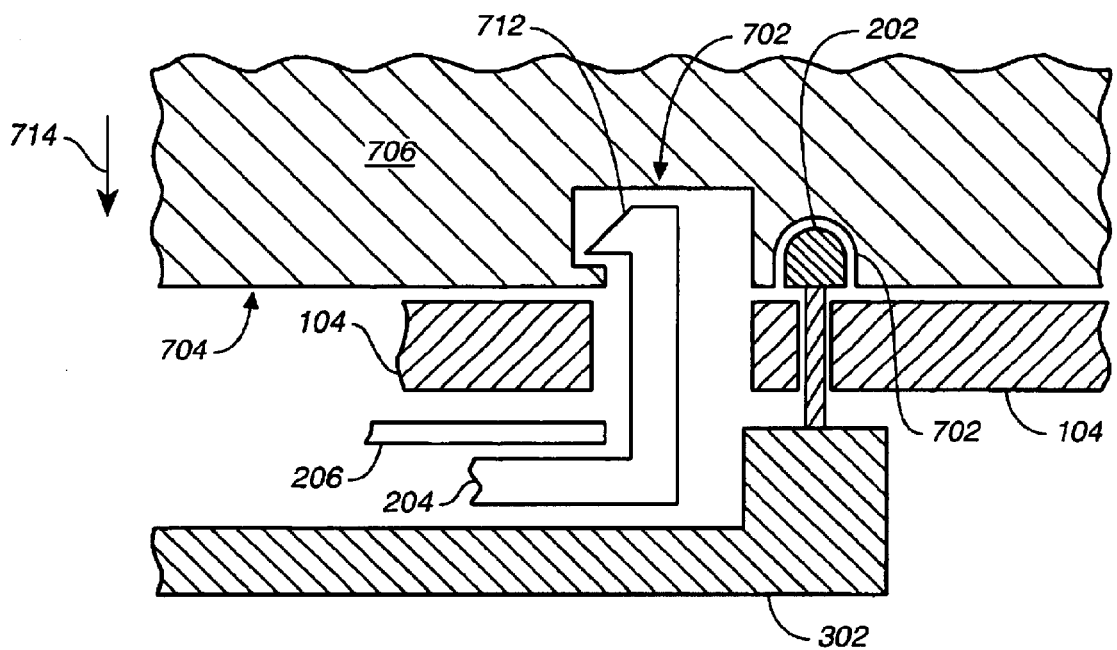
*FIG._7*
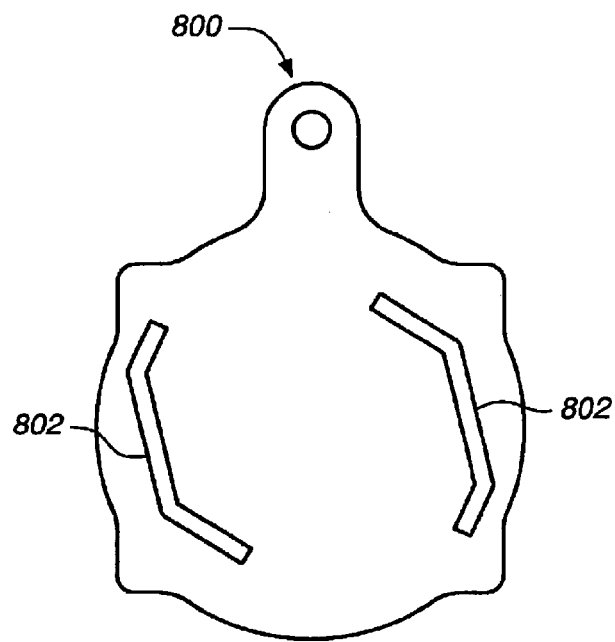
*FIG._8*

COMPUTER QUICK RELEASE LATCH

FIELD OF THE INVENTION

The present invention relates generally to attachment mechanisms, and more particularly, to a quick release latch for detaching a computer device from a secure attachment.

BACKGROUND OF THE INVENTION

Portable computer devices are now widely used by businesses and consumers. Such devices include notebook and laptop computers, tablet computers, Personal Digital Assistants (PDAs), and other types of communication devices. In addition, a full range of accessories are available to be used with these devices. Since these devices tend to be expensive, transportation and protection accessories, such as cases, covers, and leather portfolios have become very popular.

When a device is to be transported, a user can simply place the device into, for example, a leather portfolio accessory that protects the device against damage during transportation. Some portfolios allow the device to be operated while the device is still inside the portfolio. Thus, the user need not remove the device from the portfolio in order to use it.

Unfortunately, typical portfolios or carrying accessories are inconvenient and have several problems. For example, some portfolios do not attach securely to the device, so that the device is free to slide around within the portfolio. Other portfolios attach securely to the device; however, the securing mechanism interferes with the operation of the device. For example, the securing mechanism covers a portion of the display screen, obstructs buttons so that they cannot be actuated, or blocks access to input/output ports or access to internal devices, such as a CDROM device. One solution includes making the device bigger so that the attachment straps do not cover the screen or operational buttons, but having a bigger device may not be acceptable. Still other portfolios attach securely to the device, but it is difficult and time consuming to detach the device from them. As a result, if the user wishes to remove the device from the portfolio, it becomes a great inconvenience.

Therefore, it would be desirable to have an attachment mechanism that is suitable for use with carrying accessories of portable devices. The attachment mechanism should allow a portable device to be securely attached to the carrying accessory thereby preventing the device from sliding out of the closed case and falling to the floor as well as to keep the device from moving while being used. The attachment mechanism should also provide a way to quickly and easily detach the device from the carrying accessory.

SUMMARY OF THE INVENTION

The present invention includes a quick release latch mechanism that allows a user to securely attach, and quickly release, a portable device from a carrying accessory, such as a leather portfolio. Although described herein with reference to a specific portable device and carrying portfolio, one or more embodiments of a quick release latch included in the present invention are suitable for use in other types of applications where the secure attachment and quick release of a portable device is desired.

In one embodiment included in the present invention, a quick release latch mechanism is provided that securely attaches to a portable device without interfering with the user's ability to use the device. For example, the secure attachment does not obscure the display screen, interfere with the actuation of any buttons, or block access to any port or peripheral mounted on the device.

In one embodiment included in the present invention, a quick release latch mechanism is provided that includes a pivotless release handle. The release handle operates to quickly release the device from an attachment mechanism when the handle is moved in any direction (including rotation) within release plane of movement.

In one embodiment, a quick release latch for attaching and releasing a portable device from a secure attachment is provided. The latch comprises a spring-loaded attachment mechanism that can be detachably attached to a bottom surface of the portable device. The latch also comprises a release handle that is captured by the attachment mechanism, the release handle has profiled edges, and wherein movement of the release handle in any direction within a release plane causes the profiled edges to release the attachment mechanism from the portable device.

In one embodiment, a release handle is provided for use in a release mechanism for releasing a portable device from a secure attachment. The secure attachment comprises an attachment mechanism that has at least two attachment clips. The release handle comprises a first handle portion that is captured by the attachment mechanism. The first handle portion comprising profiled edges adjacent to the two attachment clips. The release handle also comprises a second handle portion that can be operated by a user, wherein the second handle portion extends from the first handle portion, and wherein movement of the second handle portion in any direction within a release plane of movement causes the first handle portion to spread the two attachment clips apart from each other to release the portable device from the secure attachment.

BRIEF DESCRIPTION OF THE DRAWINGS

The foregoing aspects and the attendant advantages of this invention will become more readily apparent by reference to the following detailed description when taken in conjunction with the accompanying drawings wherein:

FIG. 1 shows one embodiment of a portfolio for a portable device that includes a quick release latch mechanism constructed in accordance with the present invention;

FIG. 2 shows a diagram of a portion of the quick release mechanism of FIG. 1;

FIG. 3 shows one embodiment of a quick release mechanism constructed in accordance with the present invention;

FIG. 4 shows an exploded view of the components of the embodiment of the invention shown in FIG. 3;

FIG. 5 shows a detailed view of one embodiment of an attachment clip mechanism constructed in accordance with the present invention;

FIG. 6 shows functional top and side views of the release handle and attachment clips to illustrate how the profiled edges of the release handle operate to spread apart the attachment clips when the handle is moved in any direction within the release plane;

FIG. 7 illustrates how the attachment clips attach to clip receivers located at a bottom surface of a portable device in accordance with the invention; and FIG. 8 shows another embodiment of a pivotless release handle constructed in accordance with the present invention.

DETAILED DESCRIPTION

The present invention includes a quick release latch mechanism that allows a user to securely attach, and quickly release, a portable device from a carrying accessory, such as a leather portfolio. The quick release latch mechanism is suitable for use in virtually any application where secure attachment and quick release of a portable device is desired.

FIG. 1 shows one embodiment of a portfolio 100 for transporting a portable device 102 having a display screen 116. The portfolio 100 includes a quick release latch mechanism constructed in accordance with the present invention.

The portfolio 100 may be constructed of leather, cardboard, plastic, fabric, or any other material. The portable device 102 may be a personal computer, PDA, tablet computer, or any other type of portable device. Typically, a tablet computer has dimensions of approximately 8"×10"× 1" and a weight of 1–7 pounds. In such an application, the portfolio would be sized to accommodate such a device. The device 102 is attached to the portfolio at an attachment plate 104 located at an interior portion of the portfolio. The attachment plate may be constructed of plastic, metal, cardboard, or any other suitable material. Once attached to the attachment plate 104, the device 102 is secure for transporting. In this embodiment, the portfolio 100 includes a top portion 106 that is placed in an open position to install/remove or use the portable device 102, and placed in a closed position to transport the portable device. When the top portion 106 is in the closed position, the portable device 102 is protected from damage during transportation.

In the closed position, a strap 106 is used to secure the top portion 106 so that it remains in the closed position during transportation of the device. The portfolio may also include one or more pockets or storage compartments 110 that can be used to store additional items, such as cables, user manuals, or for instance, a portable keyboard 112.

The strap 108 may also be used to hold the portfolio in an upright position during operation. For example, the top portion 106 is folded in a reverse direction so as to form a support structure that is held in place by the strap 108. This is shown in FIG. 1 in the "operation" mode. The portable keyboard 112 is shown in front of the device and may interface to the device using a wired, wireless, or optical connection.

In the "attach/release" mode shown in FIG. 1, the portfolio 100 is shown lying open so that the device may be released from its secure attachment. A pivotless release handle 114 constructed in accordance with the present invention is used to release the device from the portfolio. The device may be removed for use and then reattached to the portfolio when its time to transport the device. The attachment mechanism attaches the portfolio to the back surface of the device so that there are no straps or other attachment features obstructing the device display, device buttons, or access to any device peripheral.

FIG. 2 shows a detailed view of the attachment plate 104. The attachment plate includes a flat top surface 208 that contacts a bottom surface of the portable device. An attachment mechanism is mounted to a bottom surface 210 of the attachment plate 104. As part of the attachment mechanism, alignment pins 202 pass through the attachment plate and are used to secure the attachment mechanism to the plate and align the plate 104 with the bottom surface of the portable device during installation. The alignment pins also help prevent excessive movement of the portable device when it is attached to the attachment plate. The attachment clips 204 also pass through the attachment plate and operate to clip onto corresponding clip receivers located at the bottom surface of the portable device. Thus, when the portable device is attached to the attachment plate 104, the attachment clips 204 hold the device tightly and the alignment pins prevent any slipping or sliding movement of the device.

A portion of a quick release handle 206 is also shown in FIG. 2. The handle 206 extends underneath the attachment plate so that it cannot be fully seen in FIG. 2. The handle 206 is used to operate the attachment clips 204 in order to quickly release the portable device from the attachment plate. In one embodiment, the handle 206 operates to spread the attachment clips 204 apart from each other so that the attachment clips no longer engage the corresponding clip receivers on the portable device. Once the attachment clips 204 are disengaged from the clip receivers, the portable device may be removed from the attachment plate. A more detailed discussion of the operation of the attachment clips 204 and release handle 206 is provided in the following text.

FIG. 3 shows a detailed view of the bottom surface 210 of the attachment plate 104. In this view, it is possible to see a complete view of the release handle 206 and a clip cover 302. The release handle 206 includes a small opening (shown at 304) that provides a region that can be grasped by a user to allow easy operation of the release handle. The release handle also includes profiled edges 306 that are used to operate the attachment clips. A detailed discussion of the release handle and the function of the profiled edges are provided in another section of this document.

The clip cover 302 provides multiple functions. First, the clip cover 302 operates to hold the attachment clips and their associated mechanisms in place. Thus, the attachment clips are secured to the bottom surface 210 of the attachment plate 104 and extend through openings in the attachment plate to protrude through the top surface 208 of the attachment plate 104.

Second, the clip cover 302 operates to capture the release handle 206 so that the release handle is captured between the clip cover 302 and the bottom surface 210 of the attachment plate 104. Furthermore, the release handle 206 is also captured between the attachment clips 204 so that the profiled edges of the release handle are adjacent to the attachment clips, respectively.

With the release handle 206 in the captured position, as described above, the release handle is free to move in or out, as shown by indicator 308, and left or right, as shown by indicator 310. Thus, the release handle may move in any combination of directions in a plane of movement that is parallel to the plane of the attachment plate 104. This plane of movement will be referred to as a release plane. Movement of the release handle in the release plane causes the attachment clips to be spread apart from each other, which disengages the attachment clips from the clip receivers located at the bottom of the portable device, and thus releases the device from the attachment plate. As described below, the release handle may also be rotated in clockwise and counterclockwise directions to achieve the same functionality.

FIG. 4 shows an exploded view of the components of the embodiment of the invention shown in FIG. 3. In this view, openings 402 in the attachment plate 104 can be seen. The openings 402 allow the attachment clips to pass through to the other side of the attachment plate so that they can be mated with clip receivers located on the portable device. The alignment pins 202 provide alignment and also secure the clip cover 302 to the attachment plate 104, thereby capturing the release handle 206.

The attachment clips 204 are part of a clip mechanism 404 that provides spring loaded tension that pulls the attachment clips toward each other. Operation of the handle 206 causes the attachment clips to be forced apart from each other (due to the edge profiles 306), thereby allowing the attachment clips to be disengaged from the clip receivers of the portable device.

FIG. 5 shows a detailed view of a portion of one embodiment of an attachment clip mechanism 404 constructed in accordance with the present invention. The mechanism 404 includes attachment clips 204, a spring 502, and a clip track 504. The spring 502 attaches to both clips 204 and exerts an inward force that pulls the clips together. The clips and spring are mounted in the clip track 504.

The clip track 504 allows the clips to slide together or apart for selected distances so that the clips can engage and be disengaged from the clip receivers located at the bottom of a portable device. The clip track 504 includes additional features (not shown) that prevent the clips from being pulled together all the way, and prevent the clips from being spread apart so much that they escape from the clip track. Although one embodiment of the clip mechanism 404 is shown in FIG. 5, any other type of mechanism or arrangement of clips may be substituted provided that the other mechanism performs similar functions. Thus, embodiments of the invention are not limited to the use of the clip mechanism of FIG. 5.

FIG. 6 shows functional top 608 and end 610 views of the release handle 206 and attachment clips 204 to illustrate how the profiled edges 306 of the release handle operate to spread apart the attachment clips when the handle is moved in any direction within the release plane. FIG. 6 also illustrates that the attachment clips 204 are part of clip mechanism 404 that includes spring-loaded tension 602 that pulls the attachment clips toward each other.

The release handle 206 can be constructed from plastic, metal, cardboard, or virtually any other suitable material. The release handle can be divided into two regions. The first region is a handle portion 604 that provides a handle to allow a user to grasp the release handle during operation. The second region is a profile portion 606 that includes profiled edges 306 designed to spread the attachment clips. The profiled edges are identified as edges E1, E2, E3, and E4. When the release handle is moved in any direction within the release plane, the profiled edges operate to spread the attachment clips apart from each other by overcoming the spring loaded tension included in the clip mechanism 404.

For example, moving the release handle in direction (D1) causes the profiled edges E1 and E4 to exert outward pressure on the release clips, thereby spreading the clips apart from each other. Similarly, moving the release handle in the direction (D2) causes the profiled edges E2 and E3 to exert outward pressure on the release clips, thereby spreading the clips apart from each other.

Because the release handle is captured by the clip cover (not shown in FIG. 6) and the attachment clips, moving the handle in the directions D3 and D4 causes the handle to move in a rotational motion. Thus, moving the release handle in the direction (D3) results in a clockwise rotation that causes the profiled edges E2 and E4 to exert outward pressure on the release clips, thereby spreading the clips apart from each other. Similarly, moving the release handle in the direction (D4) results in a counterclockwise rotation that causes the profiled edges E1 and E3 to exert outward pressure on the release clips, thereby spreading the clips apart from each other.

It is also possible to move the handle in the directions D3 or D4 without rotation if sufficient force is exerted to prevent the handle from rotating. Although this is not the preferred method, moving the handle in this way will also exert outward pressure on one release clip (the one in the direction of movement), thereby spread the clips apart from each other. For example, moving the handle in direction D3 without rotation will cause edges E3 and E4 to exert an outward pressure on the adjacent release clip thereby spreading the release clips apart from each other.

FIG. 7 illustrates how the attachment clips 204 attach to clip receivers 702 located at a bottom surface 704 of a portable device 706. For the purposes of clarity, the operation of only one attachment clip is shown in FIG. 7. The attachment clip 204 extends through an opening 708 in the attachment plate 104 to attach to the clip receiver 702. That attachment clip 204 includes a tapered edge 712 that allows a downward force 714 exerted by the portable device during installation to spread the attachment clips apart thereby allowing the attachment clips to enter the clip receivers 702 and lock into place to hold the portable device securely. The above installation process may be used to lock a portable device into a portfolio having a quick release latch as illustrated in FIG. 1.

To release the attachment clip after it is locked into position within the clip receiver 702, the user may move the release handle 206, which operates to spread the attachment clips apart as discussed above. Therefore, using a quick release latch in accordance with the present invention, a user is able to quickly install a portable device into a secure attachment. The secure attachment may be part of a carrying accessory, such as a leather portfolio. During transportation of the device, the attachment clips maintain a secure grasp on the device so that it does not move or slide within the portfolio. When the user is ready to remove the device, the user may move the release handle in virtually any direction within the release plane, thereby spreading and disengaging the attachment clips from the device and allowing the device to be removed from the secure attachment.

Also shown in FIG. 7 is a clip cover 302 that is mounted to the attachment plate 104 using the alignment pins 202. The alignment pins 202 operate to align the attachment plate to the portable device so that the attachment clips will easily lock into place during the installation process. For example, the alignment pins 202 align with align openings 702 located in the bottom surface of the portable device. During installation, when the alignment pins and the alignment openings are aligned, the user may press the device onto the attachment place until the attachment clips lock into the clip receivers. When the attachment clips are locked, the device is securely attached to the attachment plate, which is part of the carrying accessory.

In accordance with the present invention, the device attaches to the attachment plate via the attachment clips and the clip receivers. Thus, there are no other means or mechanisms that hold the device to the attachment plate. Because of this, the device's display screen, buttons, and peripheral devices remain unobstructed and can be freely accessed. Therefore, the device is fully function while in the attached position and may be operated by a user without removing the device from the carrying accessory.

FIG. 8 shows another embodiment of a pivotless release handle 800 constructed in accordance with the present invention. The release handle 800 includes cam slots 802. The cam slots 802 operate by guiding the release handle on pins (not shown) operating in cam slots to get an infinite variety of attachment clip motions and timing. For example, with a properly shaped cam slot it is possible to have two release points. The first release point partially releases the device to allow for rotation of the device in the portfolio.

The second release point allows removal of the device. It is also possible to use the internal cam shape alone or in conjunction with the external cam edges. Thus, in one or more embodiments included in the present invention profiled edges or cam slot edges are used to provide for a pivotless release handle that operates to quickly release a device from a secure attachment.

The present invention includes a quick release latch for releasing a portable computer device from a secure attachment. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. Quick release latch mounted on a holding surface for attaching and releasing a portable computing device from the holding surface, the latch comprising:
    a spring-loaded attachment mechanism that can be detachably attached to a bottom surface of the portable computing device; and
    a release handle having profiled edges that are operationally coupled to the attachment mechanism such that the release handle is free to move in any direction within a plane, and wherein movement of the release handle in any direction causes the profiled edges to release the attachment mechanism from the portable computing device.

2. The latch of claim 1, wherein the attachment mechanism attaches to the portable computing device using two attachment clips.

3. The latch of claim 2, wherein the release handle is captured between the two attachment clips.

4. The latch of claim 3, wherein the profiled edges are aligned with the two attachment clips.

5. The latch of claim 4, wherein the attachment clips are spring loaded and movement of the release handle operates to spread the two attachment clips apart from each other to release the portable computing device from the holding surface.

6. A release mechanism for releasing a portable computing device from a secure attachment, the release mechanism comprising an attachment mechanism that has at least two attachment clips, and a release handle comprising:
    a first handle portion that is captured by the attachment mechanism, the first handle portion comprising a generally concave profiled edge adjacent to each of the two attachment clips; and
    a second handle portion that can be manipulated by a user, wherein the second handle portion extends from the first handle portion, and wherein movement of the second handle portion in any direction within a release plane of movement causes the first handle portion to spread the two attachment clips apart from each other to release the portable computing device from the secure attachment.

7. A quick release latch for attaching and releasing a portable computing device having a generally planar bottom surface to and from a generally planar attachment surface, comprising,
    at least one moveable capture device for engaging a receiving structure on the portable computing device, the capture device protruding upwardly from the generally planar attachment surface,
    a release handle incorporated into the generally planar attachment surface, the release handle being operationally coupled to the capture device such that it is urged to a resting position when no force is applied to the release handle,
    the release handle being free to move away from the resting position in any direction in a plane in response to an applied force, such that movement of the release handle causes deflection of the moveable capture device thereby disengaging the moveable capture device from the receiving structure.

8. The latch of claim 7 comprising a plurality of moveable, protruding capture devices.

9. The latch of claim 7 wherein the moveable capture device is biased by a spring.

10. The latch of claim 9 wherein the release handle is generally planar and has at least one profiled edge which contacts the moveable capture device.

11. The latch of claim 10 wherein the release handle is urged to the resting position by the spring.

12. The latch of claim 7 wherein the release handle extends beyond an edge of the generally planar attachment surface.

13. The latch of claim 7 wherein the moveable capture device comprises a clip having a tapered edge and shaped to be inserted into a recess in the portable computing device.

14. The latch of claim 13 wherein the clip is adapted to move when a downward force is applied to the tapered edge.

* * * * *